(12) United States Patent
Barber

(10) Patent No.: US 7,825,532 B1
(45) Date of Patent: Nov. 2, 2010

(54) ELECTRICAL GENERATOR FOR WIND TURBINE

(76) Inventor: Gerald L. Barber, 410 Hudson Rd., Greenville, SC (US) 29615

( * ) Notice: Subject to any disclaimer, the term of this patent is extended or adjusted under 35 U.S.C. 154(b) by 0 days.

(21) Appl. No.: 12/432,837

(22) Filed: Apr. 30, 2009

Related U.S. Application Data

(63) Continuation-in-part of application No. 12/426,494, filed on Apr. 20, 2009.

(51) Int. Cl.
*F03D 9/00* (2006.01)
*H02P 9/04* (2006.01)
*F03B 13/00* (2006.01)
*F03B 13/10* (2006.01)

(52) U.S. Cl. ............... 290/55; 290/43; 290/44
(58) Field of Classification Search ........... 290/43, 290/44, 55; 310/216.109
See application file for complete search history.

(56) References Cited

U.S. PATENT DOCUMENTS

| | | | | |
|---|---|---|---|---|
| 1,233,232 A | | 7/1917 | Heyroth | 290/55 |
| 1,352,960 A | * | 9/1920 | Heyroth | 290/44 |
| 1,944,239 A | * | 1/1934 | Hermann | 290/55 |
| 2,827,580 A | * | 3/1958 | Jaeschke | 310/105 |
| 3,510,149 A | * | 5/1970 | Raidel | 280/86.75 |
| 3,529,193 A | * | 9/1970 | Lindstedt | 310/264 |
| 4,088,352 A | * | 5/1978 | Kling | 290/55 |
| 4,289,970 A | * | 9/1981 | Deibert | 290/44 |
| 4,330,714 A | | 5/1982 | Smith | 290/55 |
| 4,350,895 A | | 9/1982 | Cook | 290/55 |
| 4,367,413 A | * | 1/1983 | Nair | 290/52 |
| 4,417,853 A | | 11/1983 | Cook | 416/132 B |
| 4,548,546 A | * | 10/1985 | Lardellier | 415/133 |
| 4,619,585 A | | 10/1986 | Storm | 416/132 B |
| 4,720,640 A | | 1/1988 | Anderson et al. | 290/43 |
| 4,729,716 A | | 3/1988 | Schmidt | 416/10 |
| 5,315,159 A | * | 5/1994 | Gribnau | 290/55 |
| 5,319,278 A | * | 6/1994 | Myohga et al. | 310/323.12 |
| 5,428,290 A | * | 6/1995 | Porcher | 324/207.16 |
| 5,485,666 A | * | 1/1996 | Welborn et al. | 29/436 |
| 5,600,195 A | * | 2/1997 | Welborn et al. | 310/153 |
| 5,844,341 A | * | 12/1998 | Spooner et al. | 310/112 |
| 6,064,123 A | | 5/2000 | Gislason | 290/55 |
| 6,417,578 B1 | | 7/2002 | Chapman et al. | 290/44 |
| 6,836,028 B2 | | 12/2004 | Northrup et al. | 290/44 |
| 6,913,044 B2 | * | 7/2005 | Zwehl et al. | 139/1 E |
| 6,951,443 B1 | | 10/2005 | Blakemore | 415/4.3 |
| 7,042,109 B2 | * | 5/2006 | Gabrys | 290/44 |
| 7,154,191 B2 | * | 12/2006 | Jansen et al. | 290/55 |
| 7,154,193 B2 | * | 12/2006 | Jansen et al. | 290/55 |

(Continued)

OTHER PUBLICATIONS

International Search Report and Written Opinion dated Jul. 2, 2010.

*Primary Examiner*—T C Patel
*Assistant Examiner*—Pedro J Cuevas
(74) *Attorney, Agent, or Firm*—Thomas, Kayden, Horstemeyer & Risley, LLP

(57) ABSTRACT

A wind turbine or other rotary device has its outer perimeter constructed with coils that form a rotor (26) of an electrical generator. A stator assembly (52) is positioned at the lower perimeter of the path of the rotor and includes stator halves that are juxtaposed the moving rotor for generating electricity. The stator halves include an air bearing that provides substantially frictionless contact with the rotor, allowing the free rotor to move with a minimum of resistance.

16 Claims, 9 Drawing Sheets

U.S. PATENT DOCUMENTS

| | | | |
|---|---|---|---|
| 7,215,038 B2 * | 5/2007 | Bacon | 290/55 |
| 7,218,011 B2 * | 5/2007 | Hiel et al. | 290/43 |
| 7,345,377 B2 * | 3/2008 | Bacon | 290/55 |
| 7,358,624 B2 | 4/2008 | Bacon | 290/55 |
| 7,372,172 B2 * | 5/2008 | Winkler et al. | 290/43 |
| 7,385,303 B2 * | 6/2008 | Roos | 290/54 |
| 7,385,305 B2 * | 6/2008 | Casazza et al. | 290/55 |
| 7,385,306 B2 * | 6/2008 | Casazza et al. | 290/55 |
| 7,417,334 B2 * | 8/2008 | Uchiyama | 290/55 |
| 7,425,772 B2 * | 9/2008 | Novo Vidal | 290/52 |
| 7,471,009 B2 * | 12/2008 | Davis et al. | 290/54 |
| 2003/0084951 A1 * | 5/2003 | Zwehl et al. | 139/11 |
| 2003/0137149 A1 * | 7/2003 | Northrup et al. | 290/44 |
| 2003/0227174 A1 | 11/2003 | Bayly | 290/55 |
| 2006/0012182 A1 | 1/2006 | McCoin | 290/55 |
| 2007/0024060 A1 * | 2/2007 | Bacon | 290/55 |
| 2007/0166159 A1 | 7/2007 | Williams | 416/10 |
| 2007/0200349 A1 * | 8/2007 | Bacon | 290/44 |
| 2007/0200350 A1 * | 8/2007 | Bacon | 290/44 |
| 2008/0003105 A1 | 1/2008 | Nies | 416/95 |
| 2008/0253892 A1 | 10/2008 | Dehlsen | 416/147 |
| 2008/0278019 A1 * | 11/2008 | Lu et al. | 310/156.32 |
| 2009/0096217 A1 | 4/2009 | Watson | 290/55 |

* cited by examiner

ELECTRICAL GENERATOR FOR WIND TURBINE

CROSS REFERENCE TO RELATED APPLICATION

This is a continuation-in-part of U.S. patent application Ser. No. 12/426,494, filed on Apr. 20, 2009.

FIELD OF THE INVENTION

This invention concerns an electrical generator using the perimeter of a wind turbine or other rotary device as a rotor of a generator and the stator that cooperates with the rotor to generate electricity.

BACKGROUND OF THE INVENTION

Windmills have been used for many generations for the purpose of pumping water from the ground and for generating electricity. The basic advantage of the windmill is that it uses the power of the wind to rotate a wheel having radially extending blades that are driven by the wind. This rotary movement is converted into various useful purposes. For example, wind turbines in the form of propellers mounted on towers have been placed in areas where steady winds are prevalent and the wind turbines are used to generate electricity.

The blades of the conventional wind turbines are very large and made of expensive rigid material and are constructed to have the blades extend radially from a central hub, with no extra support at the outer tips of the blades. The conventional wind turbine blades rotate at a high rate of revolutions and must withstand both the centrifugal forces generated by the fast revolution of the blades and the cantilever bending forces applied to the blades by the wind. Since the outer portions of the blades move at a very high velocity and are engaged by strong winds, the larger the blades the stronger they must be and the more expensive they become. Thus, there is a practical limit as to the length and width of the blades because of the expense of stronger materials for larger blades.

Another type of wind turbine is one that has sailwings constructed of flexible material that are a substitute for the rigid blades of the conventional wind turbines described above. For example U.S. Pat. Nos. 4,330,714, 4,350,895, and 4,729,716 disclose wind turbines that do not use rigid propeller blades but use "sails" that catch the wind. The sails are mounted on radiating spars of the turbine. These particular wind turbines include circular inner and outer rims with the sails of the turbine supported by both the inner and outer rims. The outer rim supports the outer portions of the sails so that the force of the wind applied to the sails may be absorbed to a major extent by the outer rim so there is little if any cantilever force applied to the sails. This allows the blades of the wind turbine to be formed of lighter weight material, material that is not required to bear as much stress in comparison to the typical free bladed turbine.

The wind turbines of the patents cited above are constructed with an outer rail that extends circumferentially about the turbine wheel. Rubber tires or other rotary objects are placed in positions to engage the outer rail so as to rotate the rubber tires, with the driven tires in turn rotating the rotor of a generator. Thus, the rotation of the wind turbine is used to generate electricity. Several of the wheels/generator assemblies may be mounted, usually in an arc about the lower quadrant of the turbine wheel, taking advantage of the size and shape of a large wind turbine for increased electrical production. Also, some of the generators may be disconnected so as to vary the load applied to the wind turbine.

The prior art wind turbines as described above control the rate of rotation of the turbine wheel by turning the turbine wheel at angles with respect to the oncoming wind. Typically, the generators have an optimum speed range in which they operate, requiring the turbine wheel to rotate within a range of revolutions per unit of time. Also, the driving of a generator involves the application of rotary motion to the rotor of the generator and overcoming the drag and frictional forces required to operate the generator.

Thus, it would be desirable to produce and use a wind turbine or other rotary device that operates an electrical generator with a reduction in the drag and friction in the course of producing electricity, and to permit a wider range of rates of rotation of the turbine wheel while producing electricity.

SUMMARY OF THE DISCLOSURE

Briefly described, this disclosure concerns the generation of electricity from a rotary source, such as a wind driven turbine powered by atmospheric wind, and which can be used to create rotary energy that is transformed into electricity. The support of the wind turbine may comprise an upright tower with the turbine wheel rotatably mounted on the tower about a laterally extending central axis. However, other rotary devices, such as water driven wheels and solar driven wheels may be used, if appropriate. They are sometimes referred to hereinafter as rotary wheels.

The rotary wheel may be mounted on a support about a laterally extending central axis. In the case of a wind turbine, a plurality of sailwing assemblies are carried by the turbine wheel, the sailwing assemblies each including sailwings made of a flexible material, such as a sail cloth or fiberglass, extending radially from the central axis of the turbine wheel. Sail support cables extend substantially parallel to the longitudinal axis of the sailwings. Shape control means may be used for adjusting the pitch, twist and shape of the sailwings. The shape control means may include sail end supports attached to the opposed inner and outer ends of the sailwings for rotating one or both of the opposed ends of the sailwings for selectively imparting pitch and/or a longitudinal twist to the sailwing. Other shape control means may include spreader bars positioned at intervals between the opposed ends of the sailwing for adjusting the distance between the support cables, trim cables extending from the sail supports to the cables for adjusting the configuration of the sailwing. A shape control means for sailwings is disclosed in more detail in parent application Ser. No. 12/426,494, the disclosure of which is incorporated herein by reference.

The wind turbine wheel may include an outer perimeter rail that can be used for both stabilizing and supporting the sailwings and for forming a rotor for a stator that together function as an electrical generator.

Also, an intermediate circular rail, concentric with the outer perimeter rail, may be used to mechanically drive a generator at that position. The use of generators at the intermediate rail of the wind turbine allows the wind turbine to drive a generator at a slower speed than by the outer perimeter rail.

Other features and advantages of the structure and process disclosed herein may be understood from the following specification and accompanying drawings.

DETAILED DESCRIPTION

Figure 1A:
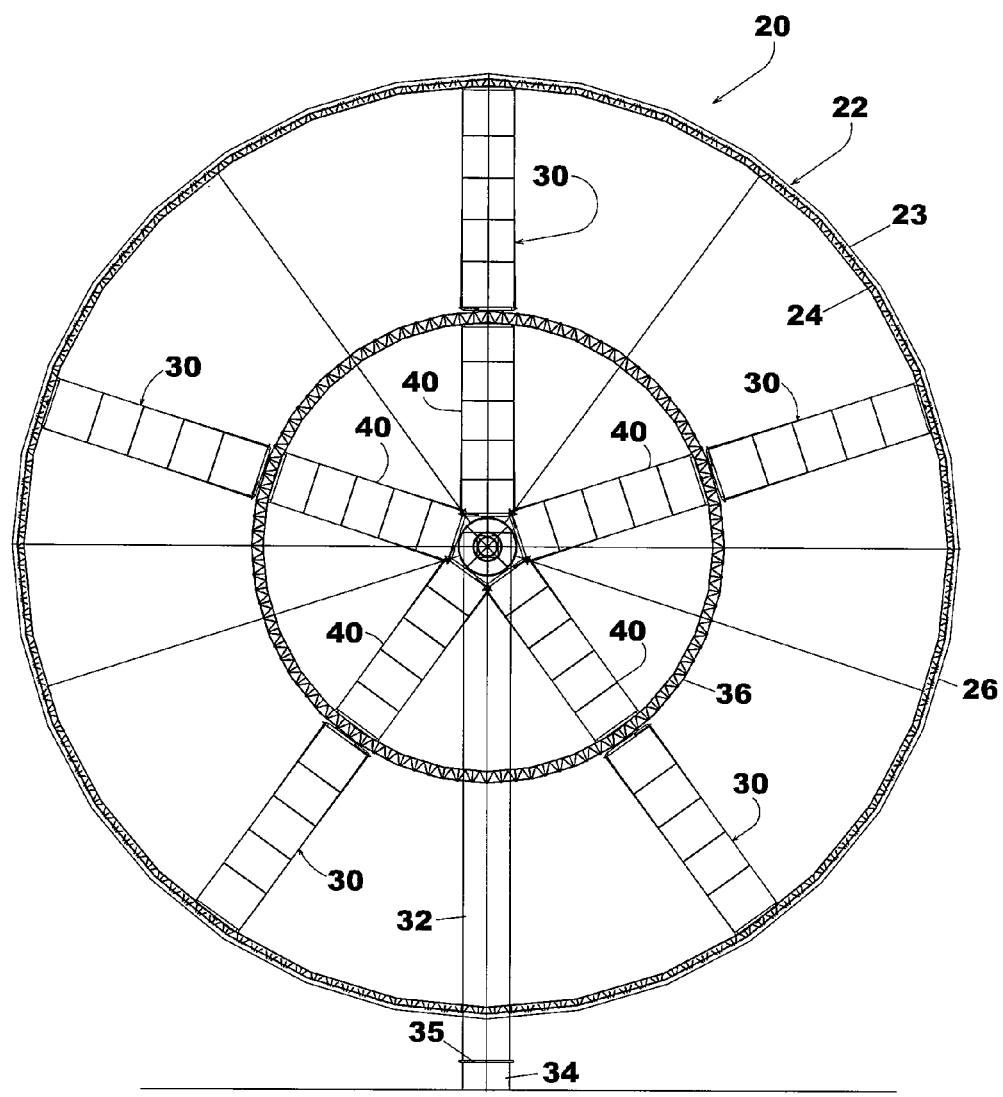
FIG. 1A is a front elevational view of a wind turbine.
Figure 1C:
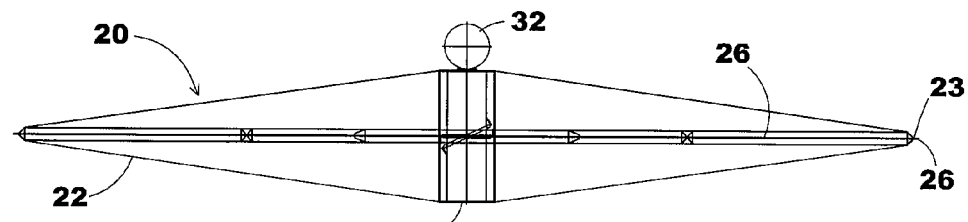
FIG. 1C is a top view of the wind turbine of FIGS. 1A and 1B.
Figure 1B:
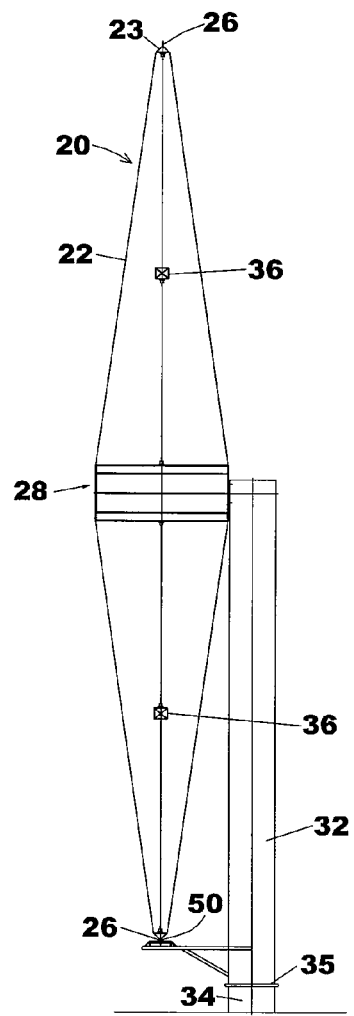
FIG. 1B is a side elevational view of the wind turbine of FIG. 1A.

Referring now in more detail to the drawings in which like numerals indicate like parts throughout the several views, FIGS. 1A, 1B and 1C shows a wind turbine 20 that is designed for catching the wind and rotating for the purpose of generating electricity. The wind turbine includes a turbine wheel 22 having an outer perimeter 23 formed by a series of angle braces 24 and an outer perimeter circular rail 26 that extends continuously about the turbine wheel. The outer perimeter circular rail may be formed of arcuate segments, and as explained in more detail hereinafter, the perimeter rail may function as the rotor of an electrical generator.

An axle structure 28 is at the center of the turbine wheel 22 and a plurality of sailwing assemblies 30 are mounted to the axle structure 28 and extend radially toward the angle braces 24 that form the perimeter of the turbine wheel.

The turbine wheel may be mounted on an upright mast 32, and the mast is rotatably mounted on the ground support 34 by a yaw bearing 35. The mast 32 may be generally triangular in cross section, having one side of the triangle around its side facing the turbine wheel 22 and converging sides of the triangle trailing away from the rounded side. This shape provides a high bend resistance against the oncoming wind forces. Other cross sectional shapes of the mast may be used, as desired. A turning mechanism is provided (not shown) for rotating the mast 32 on its yaw bearing 35 with respect to the ground support 34 so as to turn the turbine wheel 22 into the wind.

In the embodiment illustrated in FIG. 1A, the turbine wheel 22 may include an intermediate support ring 36 which is concentric with the perimeter circular rail 26 and concentric with the axle structure 28. Both the outer perimeter circular rail 26 and intermediate support ring 36 rotate in unison about the axle structure.

Figure 2:
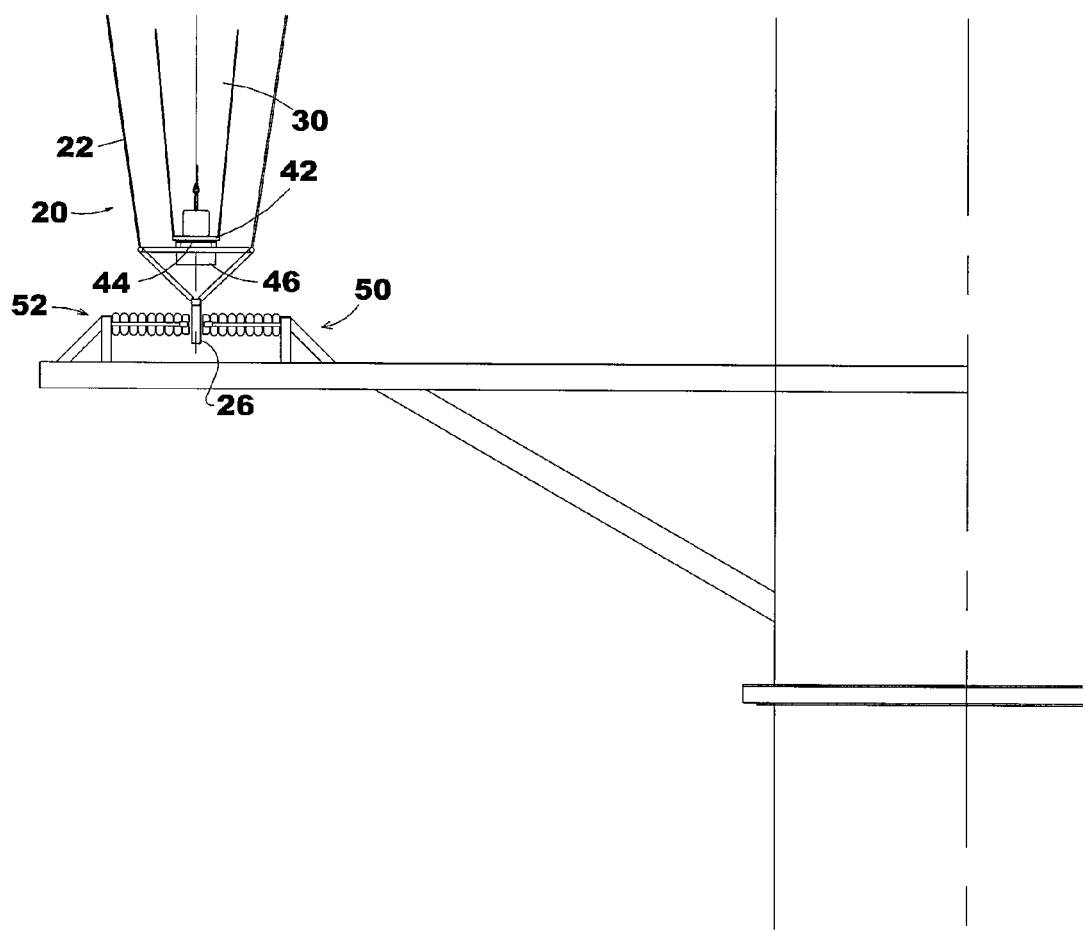
FIG. 2 is a side view, similar to FIG. 1B, but showing more details of the lower portion of the rotor and stator of the wind turbine.

Inner sailwings 40 may be supported between the axle structure 28 and the intermediate support ring 36, while the outer sailwings 30 may be supported between the intermediate support ring 36 and the outer perimeter circular rail 26. The outer and inner sailwings may be oriented at different angles with respect to the oncoming wind. For example, FIG. 2 shows outer sailwing 30 supported at its perimeter by a sail end support 42, with the sail end support 42 being supported by a slewing ring 44, with a motor 46 used to rotate the slewing ring and the sail end support. This type turning mechanism may be used to form a twist and/or pitch to the sailwings 30 and 40.

The electrical generator 50 is illustrated in FIGS. 2-5. The outer perimeter circular rail 26 functions as the rotor of the generator. A stator assembly 52 is mounted at the perimeter of the turbine wheel 22 and is positioned to receive the outer perimeter circular rail 26 that functions as the rotor of the generator. The rotor 26 is formed in arcuate segments about the perimeter of the turbine wheel, and each arcuate segment of the rotor includes its own coils.

Figure 4:
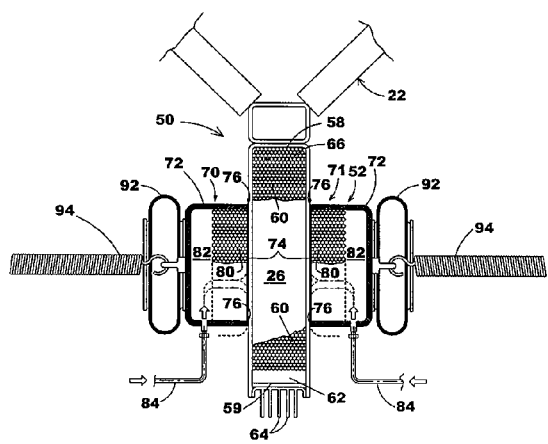
FIG. 4 is a close-up detailed view of the electrical generator, showing the outer perimeter rail that functions as a rotor of the generator at the bottom of its circular path, and showing the central portion of the stator.
Figure 5:
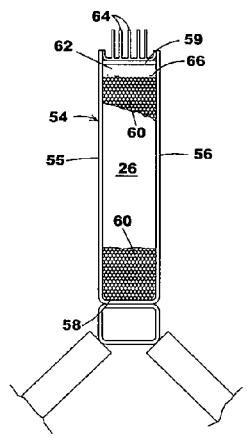
FIG. 5 is a cross-sectional view of the rotor inverted from FIG. 4.
Figure 6:
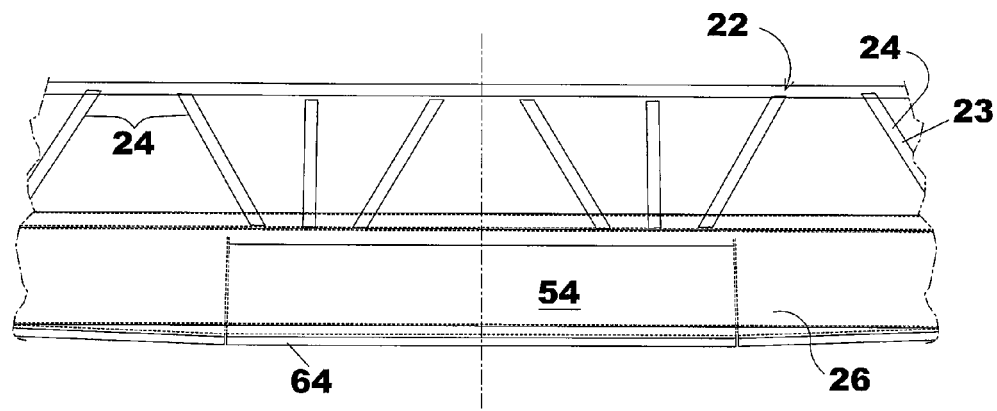
FIG. 6 is a side view of an outer perimeter rail that functions as a rotor for the electrical generator.

As shown in FIG. 5, the rotor segments each include the closed housing 54 having flat opposed side walls 55 and 56, inner end wall 58 and outer end wall 59. The electrical coils 60 are positioned in the closed housing with a space 62 formed between the coils 60 and the outer end wall 59. Cooling fins 64 extend from the outer end wall 59 for the purpose of extracting heat from the rotor 26. Also, a cooling liquid, such as oil 66, occupies some of the space about the coils 60. The cooling liquid 66 may not completely fill the inside of its rotor segment, leaving a space inside the rotor segment. As the turbine wheel rotates, the segments of the rotor 26 will be inverted with FIG. 4 showing a segment of the rotor at the lower arc of its rotation, and FIG. 5 showing a segment of the rotor when it is passing over the upper arc of its rotation. The cooling liquid 66 is influenced by gravity and by centrifugal force to move within the interior of the rotor 26, making contact with the coils and with the interior facing surfaces of the opposed side walls 55 and 56 and the interior facing surfaces of the inner end wall 58 and outer end wall 59. This tends to transmit the heat of the coils to the walls of the rotor, so as the rotor moves away from and then back toward the stator, the cooling fins 64 and the external surfaces of the walls of the rotor tend to shed their heat.

As shown in FIG. 4, stator 52 includes stator halves 70 and 71 that are positioned on opposite sides of the path of the rotor 26 as the rotor rotates on the turbine wheel 22. Stator halves 70 and 71 may be substantially identical and each includes a substantially cup-shaped stator housing 72 having its opening 74 facing the opposed side walls 55 and 56 of the rotor 26. The edges 76 about the cup-shaped stator housings each have a flat rim facing said rotor, the rims are shaped for forming the air escaping from the stator housings into a film of air between each stator housing and the rotor, such that an air bearing is formed between the stator housings and the rotor. The air bearing reduces the friction between the rotor and the stators.

The coils 80 of the stator halves are maintained in juxtaposition with the rotor 26 by the stator housings 72.

A space 82 is formed in the cup-shaped stator housing behind the stator coils 80, with the space forming an air passage for the movement of air through the coils of the stator. An air conduit 84 communicates with the space 82 of each stator housing 72 to supply air to the air passage 82 behind the stator coils 80 so that the air moves from the air passage through the stator coils, cooling the stator coils. After the air moves through and about the stator coils the air passes between the flat face of the rotor 26 and edges 76 of the cup-shaped stator housing 72. As the air passes the edges 76 of the cup-shaped stator housings 72, the air forms an air bearing between the stator housings 72 and the facing surfaces of the rotor 26. The air moving from the edges of the stator housings forms the air bearing against the flat facing surface of the rotor 26 that assures that the stator housings will not frictionally engage the surfaces of the rotor.

The turbine wheel may be of very large diameter, in excess of 100 feet in diameter. When the turbine wheel of such great size is rotated, it is likely that the rotor segments 26 will not follow exactly the same paths, such that the rotor segments may experience a lateral wobbling motion as they move through the stators, and/or move shallower or deeper into the stator assembly 52. Because of the likelihood of this movement, it is desirable to have the stator move laterally in response to the lateral motions of the rotor, and it is desirable to have the rotor built with a height that is greater than the height of the stator so that the stator can always be in the electrical field of the coils of the rotor.

Figure 3:
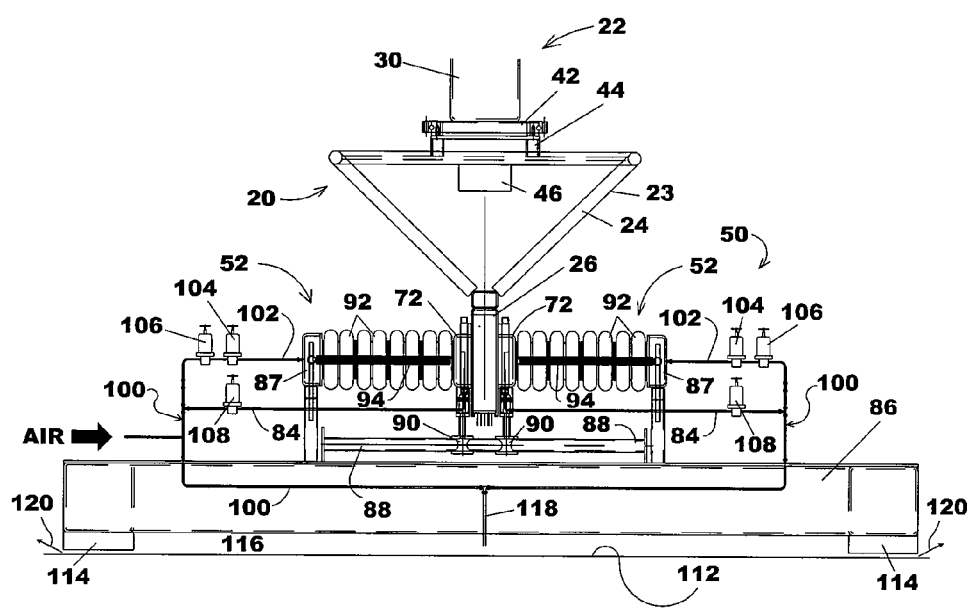
FIG. 3 is a closer view of the electrical generator shown in FIG. 2.

As shown in FIG. 3, in order to accommodate the likely lateral motion of the rotor 26, the stator assembly 52 includes a support platform 86, with a support frame having stator support rails 88 mounted on the support platform. The stator housings 72 are mounted on the support rails 88 by means of rollers, such as rollers 90 that may travel along the stator support rails 88. Inflatable bellows 92 are positioned on the closed sides of the stator housings 72. The bellows 92 are in the shape of air bags connected at one end each to a stator housing 72 and supported at the distal ends by the support frame of the stator. When the bellows 92 are inflated, they urge the stator housings 72 toward engagement with the rotor 26, with the air bearing at the edges of the stator housings helping to avoid the stator housings from contacting the rotor. Equal pressures are maintained in the inflatable bellows 92 on both sides of the stator housings so that when the rotor moves laterally, the bellows tend to urge the stators in the same lateral direction of movement of the rotor. Thus, the air bags function as a first biasing means engaging said stator housings for urging said stators toward said rotor.

In order to assure that the stators will relieve their force toward the rotor at times when the generator is to be deactivated, coil tension springs 94 extend from the lateral support structure 87 to the stator housings 72, tending to urge the stator housings away from the rotor. Thus, the springs function as a second biasing means engaging said stator housings for urging said stators away from said rotor.

FIG. 3 illustrates the air supply system for the stator assembly 52. An air supply device of conventional design (not shown) communicates with the air conduit system 100. The air flows to the inflatable bellows 92 through conduits 102 at opposite ends of the stator, through an air pressure regulator 104, and an air pressure release valve 106, to the series of bellows 92. The air pressure to the bellows is regulated by the air pressure regulators 104 to apply the stator housings 72 toward the rotor 26, with equal pressure applied to the bellows on both sides of the rotor.

Air pressure relief valves 106 function to discharge the air from the bellows 92 when the air pressure drops below a predetermined value. This allows springs 94 to move the stator housings away from the rotor when air pressure is depleted.

Likewise, the air pressure control valves 108 control the movement of air through conduit 84 to the stator housings 72 as previously described. This maintains the cooling of the stator coils and establishes the air bearing at the edges of the cup-shaped stator housings with respect to the facing surfaces of the rotor 26.

While it is anticipated that the above described adjustable positioning features of the stator will be sufficient to have the stator housings accurately follow the lateral movements of the rotor, the air from the air source 98 also may be used to form an air bearing between the support platform 86 and its support surface 112. The perimeter of the support platform 86 is formed with a downwardly extending rim 114 that forms a closed space between the bottom surface of the support platform 86 and the upwardly facing surface 112 of the support. Air is moved through the downwardly extending conduit 118 to the space 116, generating enough upward force to tend to lift the support platform, thereby forming spaces beneath the perimeter rim 114 with the movement of escaping air 120. The escaping air 120 forms an air bearing beneath the support platform 86, allowing it to move in lateral directions, following the lateral motions of the rotor 26.

Figure 7:
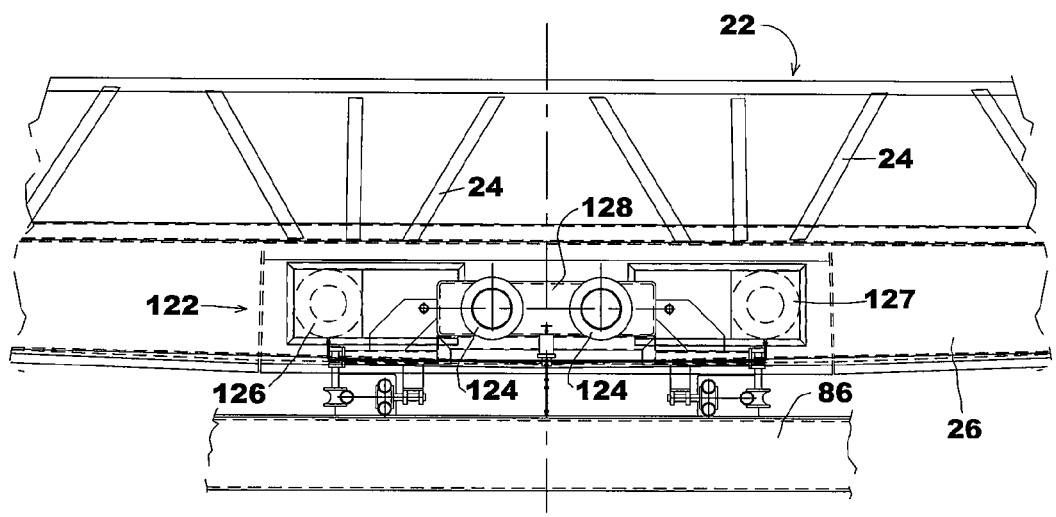
FIG. 7 is an end view of another embodiment of the stator as applied to the outer perimeter rail that functions as a rotor, with pairs of air bearings displaced on opposite sides of the stator.

FIG. 7 illustrates a modified stator assembly 122 that includes inflatable air bellows 124 that urge the stator halves toward the rotor 26, but the air bearing is displaced laterally from the stator halves. A pair of air bearings 126 and 127 are supported by the stator halves, such as stator half 128, so that the air bearings 126 and 127 are movable in unison with their respective stator half. The air bearings are displaced laterally from each other and from the stator housings so as to assure more perfect alignment of the stator housings with the moving rotor surfaces.

Figure 8A:
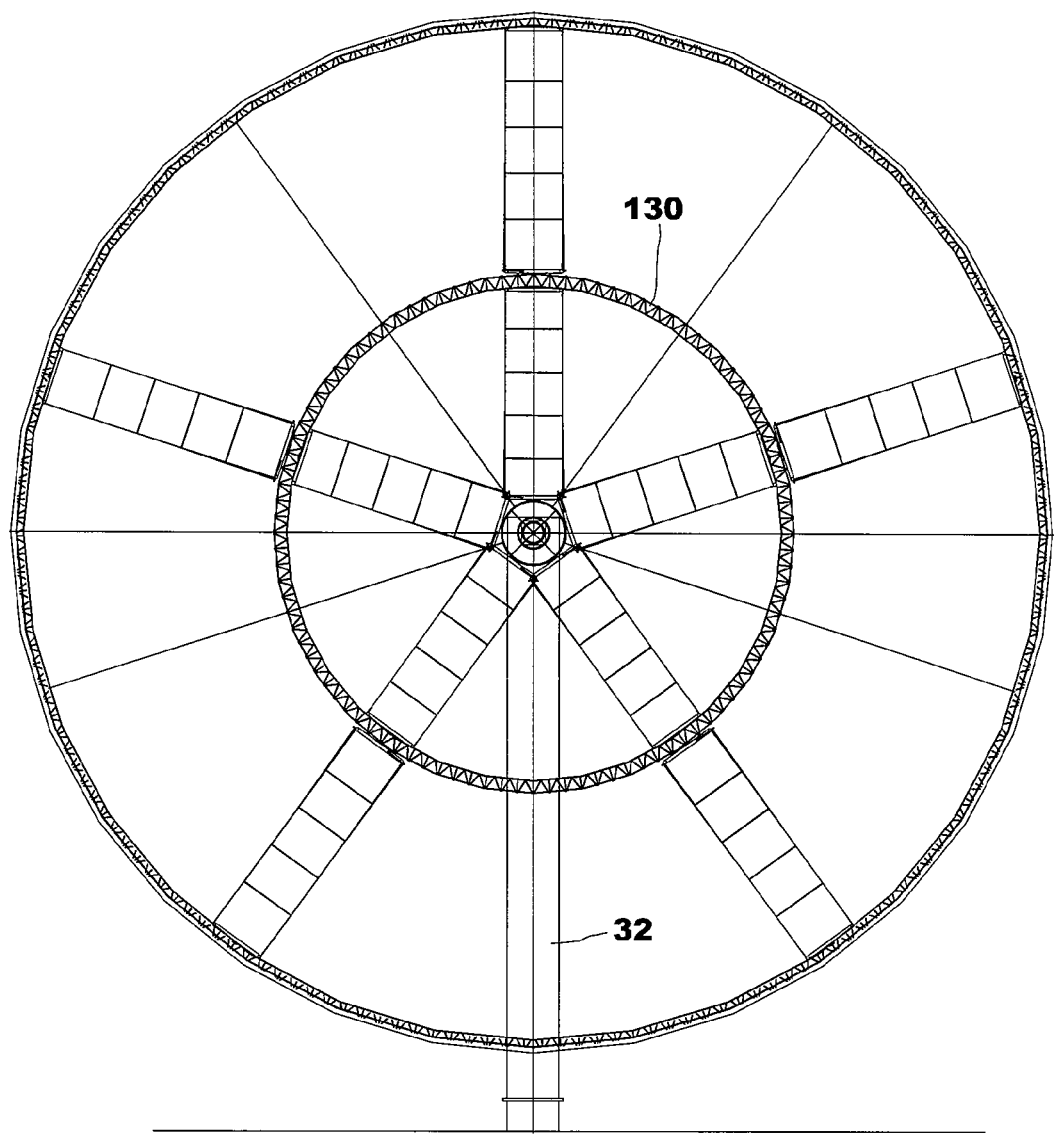
FIGS. 8A, 8B, and 8C are similar to FIGS. 1A, 1B, and 1C except that FIGS. 8A, 8B and 8C disclose a wind turbine having an intermediate circular rail with electrical generators applied to the intermediate circular rail.
Figure 8C:
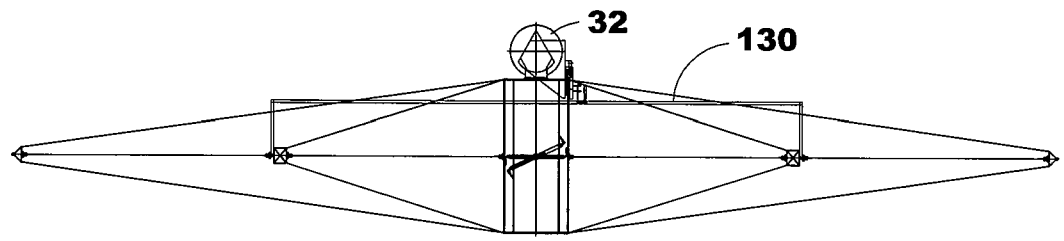
Figure 8B:
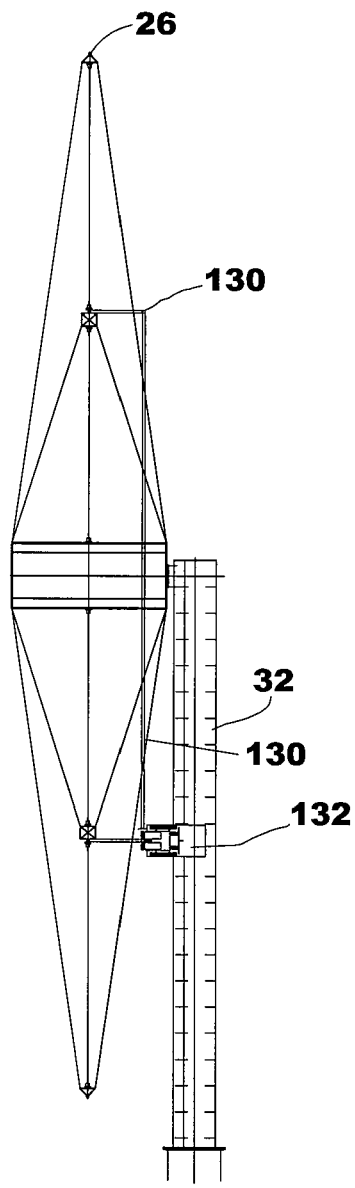
Figure 9:
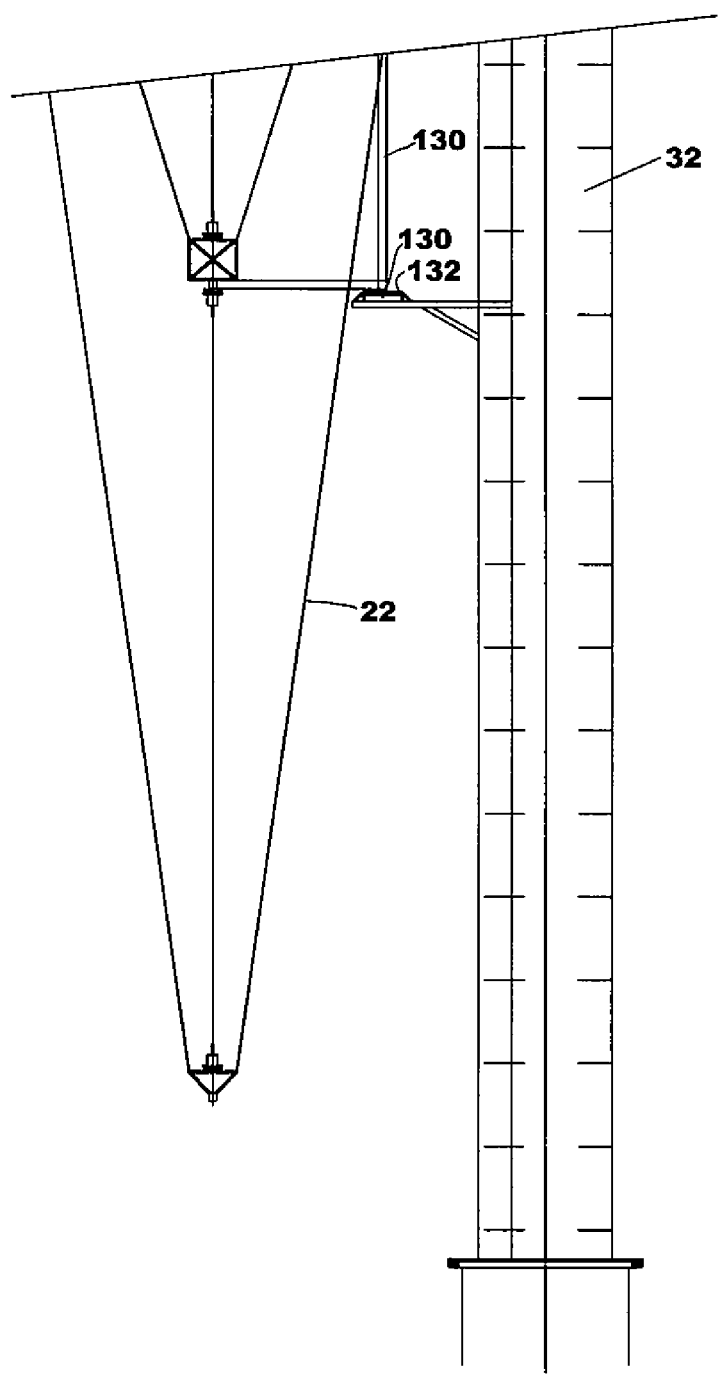
FIG. 9 shows the electrical generator of FIG. 8.

FIGS. 8A, 8B, and 8C illustrate an air turbine wheel that includes an inner rail 130. Inner rail 130 is circular and is concentric with rotor 26 of the prior figures. The inner rail 130 may be formed with the coils of a rotor, and a floating stator assembly 52 of the type illustrated in FIGS. 2-5 may be applied to the inner rail 130. The inner rail 130 of the turbine wheel 22 is displaced laterally of the main portion of the turbine wheel, adjacent the mast 32. As shown in FIG. 9, the stator 132 may be positioned to receive the inner rail 130 for generating electricity.

While FIG. 2 shows the electrical generator 50 at the perimeter rail 26 and FIG. 9 shows the electrical generator 132 at the inner rail 130, it is possible to have electrical generators mounted at both the perimeter rail and the inner rail. With this double arrangement, the electrical generator at the inner rail may be used in high velocity winds where the movement of the rotor through the stator is relatively slow, and the electrical generator at the outer rail may be used in slow velocity winds where the movement of the rotor through the stator is relatively high.

It will be understood by those skilled in the art that while the foregoing description sets forth in detail preferred embodiments of the present invention, modifications, additions, and changes might be made thereto without departing from the spirit and scope of the invention, as set forth in the following claims.

The invention claimed is:

1. An electrical generator for a wheel mounted for rotation on a horizontal axis, said electrical generator comprising:
a circular rotor mounted on said wheel and extending concentrically about the horizontal axis for rotation with the wheel in a perimeter path about the horizontal axis, said circular rotor including radially extending opposed sides,
a stator positioned at the perimeter path of said rotor, said stator shaped for receiving said rotor and generating electricity in response to the rotation of said rotor, said stator including a pair of opposed stator housings positioned on opposite sides of said rotor, said stator housings each including a field coil opening facing said opposed sides of said rotor, and field coils positioned in each of said stator housings and facing said rotor through said field coil openings, and biasing means for selectively urging said stator housings toward each other and toward said rotor, and second biasing means for continuously biasing said stator housings away from each other and away from said rotor.

2. The electrical generator of claim 1, and further including air supply means in communication with said pair of opposed stator housings and said field coils for supplying air to said stator housings and said field coils,
said stator housings each having a rim facing said rotor, said rims shaped for forming a film of air between the rim of each said stator housing and said rotor, such that air bearings are formed between said rims of said stator housings and said opposed sides of said rotor configured to maintain space between each said stator housing and said rotor.

3. The electrical generator of claim 2, and wherein said air supply means is configured to cool the field coils in said stator housings.

4. The electrical generator of claim 1, and wherein said rotor is formed in series of arcuate segments.

5. The electrical generator of claim 1, and wherein said second biasing means includes a spring in biased relationship with each of said stators for urging each of said stators away from said rotor, and said biasing means includes inflatable air bags in biasing relationship with each of said stators configured for urging said stators toward said rotor.

6. The electrical generator of claim 1, and wherein said wheel is a wind turbine and includes a plurality of radially extending sailwings for catching the wind.

7. An electrical generator for a wheel mounted for rotation on a horizontal axis, said electrical generator comprising:
a circular rotor mounted on said wheel and extending concentrically about the horizontal axis for rotation with the wheel in a perimeter path about the horizontal axis, and
a stator positioned at the perimeter path of said rotor shaped for receiving said rotor and generating electricity in response to the rotation of said rotor, said rotor formed in series of arcuate segments, wherein said arcuate segments each include an oil chamber for cooling said rotor.

8. The electrical generator of claim 7, wherein said rotor includes cooling fins for cooling said rotor.

9. An electrical generator for a wheel mounted for rotation on a horizontal axis, said electrical generator comprising:
a circular rotor mounted on said wheel and extending concentrically about the horizontal axis for rotation with the wheel in a perimeter path about the horizontal axis, said circular rotor including radially extending opposed sides,
a stator positioned at the perimeter path of said rotor, said stator shaped for receiving said rotor and generating electricity in response to the rotation of said rotor, said stator including a pair of opposed stator housings positioned on opposite sides of said rotor, said stator housings each including a field coil opening facing said opposed sides of said rotor, and field coils positioned in each of said stator housings and facing said rotor through said field coil openings, and
wherein said first biasing means comprises inflatable air bags for selectively urging said stator housings toward said rotor and for relieving the urging of said stator housings toward said rotor, and second biasing means comprises coil tension springs for continuously biasing said stator housings away from said rotor.

10. An electrical generator for producing electricity comprising:
an annular rotor formed by a series of rotor segments, each said rotor segment including coils, and said rotor segments extending about a lateral axis of rotation and rotatable through an arc of an annular path,
a stator positioned at said arc of said annular path of said segments, said stator including coils positioned on opposite sides of said arc of said annular path and shaped to receive there between said segments of said rotor, and
first biasing means for yieldably urging said coils of said stator laterally toward juxtaposition with opposite sides of said rotor and generating electricity and for moving laterally with said coils of said stator in response to the lateral movement of said rotor while continuing to generate electricity.

11. The electrical generator of claim 10, and further including an air supply means for forming an air bearing between said rotor and said stator for maintaining said stator juxtaposed said rotor.

12. The electrical generator of claim 10, wherein
said stator comprises stator housings, said stator housings positioned on opposite sides of said annular path, said stator housings each including a stator opening facing said annular path,
said coils of said stator positioned in said stator housings at said stator openings and facing said annular path,
said stator housings configured for forming air bearings between said rotor and said stator housings, and
air supply means for supplying air to said stator housings and forming said air bearings and maintaining said stator housings in juxtaposition with said rotor.

13. An electrical generator for a wheel mounted for rotation on a horizontal axis, said electrical generator comprising:
a circular rotor mounted on said wheel and extending concentrically about the horizontal axis for rotation with the wheel in an annular path about the horizontal axis, said circular rotor including radially extending opposed sides,
a stator positioned at the annular path of said rotor, said stator shaped for receiving said rotor and including a pair of field coils positioned on said opposite sides of said rotor and generating electricity in response to the rotation of said rotor, and
biasing means for selectively urging said stators toward each other and toward juxtaposition with said radially extending opposed sides of said rotor for generating electricity in response to rotation of said rotor in the annular path, said biasing means configured for moving said coils of said stator laterally in response to the lateral movement of said rotor while continuing to generate electricity.

14. The electrical generator of claim 13, wherein said biasing means comprises air operated bellows.

15. The electrical generator of claim 13, wherein
said stator comprises stator housings, said stator housings positioned on opposite sides of said annular path, said stator housings each including a stator opening facing said annular path,
said coils of said stator positioned in said stator housings at said stator openings and facing said annular path,
said stator housings configured for forming air bearings between said rotor and said stator housings, and
air supply means for supplying air to said stator housings and forming said air bearings and maintaining said stator housings in juxtaposition with said rotor.

16. The electrical generator of claim 13, wherein said biasing means comprises a spring.

* * * * *